US012623677B2

(12) United States Patent　　　　(10) Patent No.:　US 12,623,677 B2
Camhi Espinoza et al.　　　　　　　(45) Date of Patent:　May 12, 2026

(54) SCOPE MANAGER FOR AUTONOMOUS VEHICLE

(71) Applicant: Toyota Jidosha Kabushiki Kaisha, Toyota (JP)

(72) Inventors: Jaime S. Camhi Espinoza, Los Gatos, CA (US); Michael L. Elkins, Framingham, MA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 106 days.

(21) Appl. No.: 18/426,895

(22) Filed: Jan. 30, 2024

(65) Prior Publication Data

US 2025/0242823 A1　　Jul. 31, 2025

(51) Int. Cl.
　　　*B60W 50/14*　　　(2020.01)
　　　*B60W 30/14*　　　(2006.01)
　　　*B60W 30/16*　　　(2020.01)
　　　*B60W 40/08*　　　(2012.01)
　　　*B60W 60/00*　　　(2020.01)
(52) U.S. Cl.
　　　CPC ......... *B60W 50/14* (2013.01); *B60W 30/146* (2013.01); *B60W 30/16* (2013.01); *B60W 40/08* (2013.01); *B60W 60/00186* (2020.02); *B60W 2040/0818* (2013.01); *B60W 2540/225* (2020.02); *B60W 2540/229* (2020.02);
(Continued)

(58) Field of Classification Search
　　　CPC .......... B60W 50/14; B60W 60/00186; B60W 30/146; B60W 30/16; B60W 40/08; B60W 2540/225; B60W 2554/4029; B60W 2540/229; B60W 2554/406; B60W 2554/80; B60W 2040/0818

USPC .......................................................... 340/576
See application file for complete search history.

(56) References Cited

U.S. PATENT DOCUMENTS

2009/0167516 A1　7/2009　Kogawara et al.
2011/0169625 A1*　7/2011　James ................. B60W 30/095
　　　　　　　　　　　　　　　　340/439
(Continued)

FOREIGN PATENT DOCUMENTS

CN　　　111845749 A　　10/2020
WO　　2019025064 A1　　2/2019
WO　　2023007844 A1　　2/2023

OTHER PUBLICATIONS

Autonomous Driving Architectures, Perception and Data Fusion: A Review (https://www.semanticscholar.org/paper/Autonomous-Driving-Architectures%2C-Perception-and-A-Velasco-Hern%C3%A1ndez-Yeong/34c6f8b20aa971af96d14c66941966791e5cfd59) Sep. 3, 2020.

*Primary Examiner* — Naomi J Small
(74) *Attorney, Agent, or Firm* — DINSMORE & SHOHL LLP

(57) ABSTRACT

A vehicle system of a vehicle may include one or more processors that receive first data indicating a driving environment of the vehicle while performing autonomous driving, receive second data indicating a direction that a driver of the vehicle is looking at a plurality of time steps, determine a first duration of time that the driver is allowed to look away from a first set of predetermined directions based on the first data, determine a second duration of time that the driver has looked away from the first set of predetermined directions based on the second data, and when the second duration of time is greater than the first duration of time, output a warning to the driver.

20 Claims, 5 Drawing Sheets

(52) U.S. Cl.
    CPC ............... *B60W 2554/4029* (2020.02); *B60W 2554/406* (2020.02); *B60W 2554/80* (2020.02)

(56) References Cited

U.S. PATENT DOCUMENTS

| | | | |
|---|---|---|---|
| 2015/0062141 A1* | 3/2015 | Hayasaka | B60R 1/24 |
| | | | 345/581 |
| 2018/0229737 A1* | 8/2018 | Towal | B60W 30/165 |
| 2020/0062276 A1* | 2/2020 | Yuan | G02B 27/0101 |
| 2020/0183383 A1* | 6/2020 | Stent | G05D 1/0061 |
| 2022/0289251 A1 | 9/2022 | Goto et al. | |
| 2023/0025222 A1 | 1/2023 | Zhang et al. | |
| 2023/0339476 A1* | 10/2023 | Oba | B60W 50/14 |
| 2024/0280997 A1* | 8/2024 | Oba | G08G 1/20 |
| 2024/0422396 A1* | 12/2024 | Loughman | G06V 40/174 |
| 2025/0187588 A1* | 6/2025 | Dastous | B60L 58/21 |

\* cited by examiner

RECEIVE SENSOR DATA ~400

RECEIVE DRIVER IMAGES ~402

DETERMINE DRIVER ATTENTION DIRECTION ~404

DETERMINE DRIVER ATTENTIVENESS ~406

DETERMINE GLANCE AWAY DURATION ALLOWANCE ~408

GLANCE DURATION EXCEEDS ALLOWANCE? ~410

NO

YES

OUTPUT WARNING ~412

RECEIVE SENSOR DATA ⟶ 500

RECEIVE DRIVER IMAGES ⟶ 502

DETERMINE DRIVER ATTENTION DIRECTION ⟶ 504

DETERMINE DRIVER ATTENTIVENESS ⟶ 506

DETERMINE AUTONOMOUS DRIVING SCOPE ⟶ 508

DETERMINE TRAJECTORY ⟶ 510

CONTROL AUTONOMOUS VEHICLE ⟶ 512

SCOPE MANAGER FOR AUTONOMOUS VEHICLE

TECHNICAL FIELD

The present specification relates to autonomous driving, and more particularly, to a scope manager for an autonomous vehicle.

BACKGROUND

Modern vehicles can operate with different levels of autonomy. Driving automation is typically specified as one of six levels ranging from L0-L5. Level L0 is no automation, in which a human driver performs all driving functions. Level L1 is driver assistance, in which a vehicle includes a single automated system. Level L2 is partial automation, in which the vehicle autonomously performs steering and acceleration, but a human driver monitors vehicle operation and can take control of the vehicle at any time. Level L3 is conditional automation, in which the vehicle autonomously performs most driving tasks but human override is still required. Level L4 is high automation, in which the vehicle autonomously performs all driving tasks under specific circumstances, but human override is still possible. Level L5 is full automation, in which the vehicle autonomously performs all driving tasks under all conditions, and no human monitoring or interaction is needed.

As stated above, in an L2 driving system, a vehicle may be autonomously driven, but a human driver must monitor the autonomously driven vehicle and take over manual control in certain situations. However, human drivers in an L2 vehicle may not be as attentive as they should be while the vehicle is being autonomously driven, and as such, may not be able to take over manual control of the vehicle in a quick enough manner when manual control is required. As such, it may be desirable to monitor the human driver to ensure that the driver is sufficiently attentive while the vehicle is being autonomously driven, and output a warning when the driver is not sufficiently attentive. However, the required level of driver attention may vary based on driving situation. Thus, a need exists for an improved method of monitoring drivers and performing autonomous driving in an L2 driving system.

SUMMARY

In an embodiment, a vehicle system of a vehicle may include one or more processors that receive first data indicating a driving environment of the vehicle while performing autonomous driving, receive second data indicating a direction that a driver of the vehicle is looking at a plurality of time steps, determine a first duration of time that the driver is allowed to look away from a first set of predetermined directions based on the first data, determine a second duration of time that the driver has looked away from the first set of predetermined directions based on the second data, and when the second duration of time is greater than the first duration of time, output a warning to the driver.

In another embodiment, a method may include receiving first data indicating a driving environment of a vehicle while performing autonomous driving, receiving second data indicating a direction that a driver of the vehicle has looked at a plurality of time steps, determining a first duration of that the driver is allowed to look away from a first set of predetermined directions based on the first data, determining a second duration of time that the driver has looked away from the first set of predetermined directions based on the second data, and when the second duration of time is greater than the first duration of time, outputting a warning to the driver.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
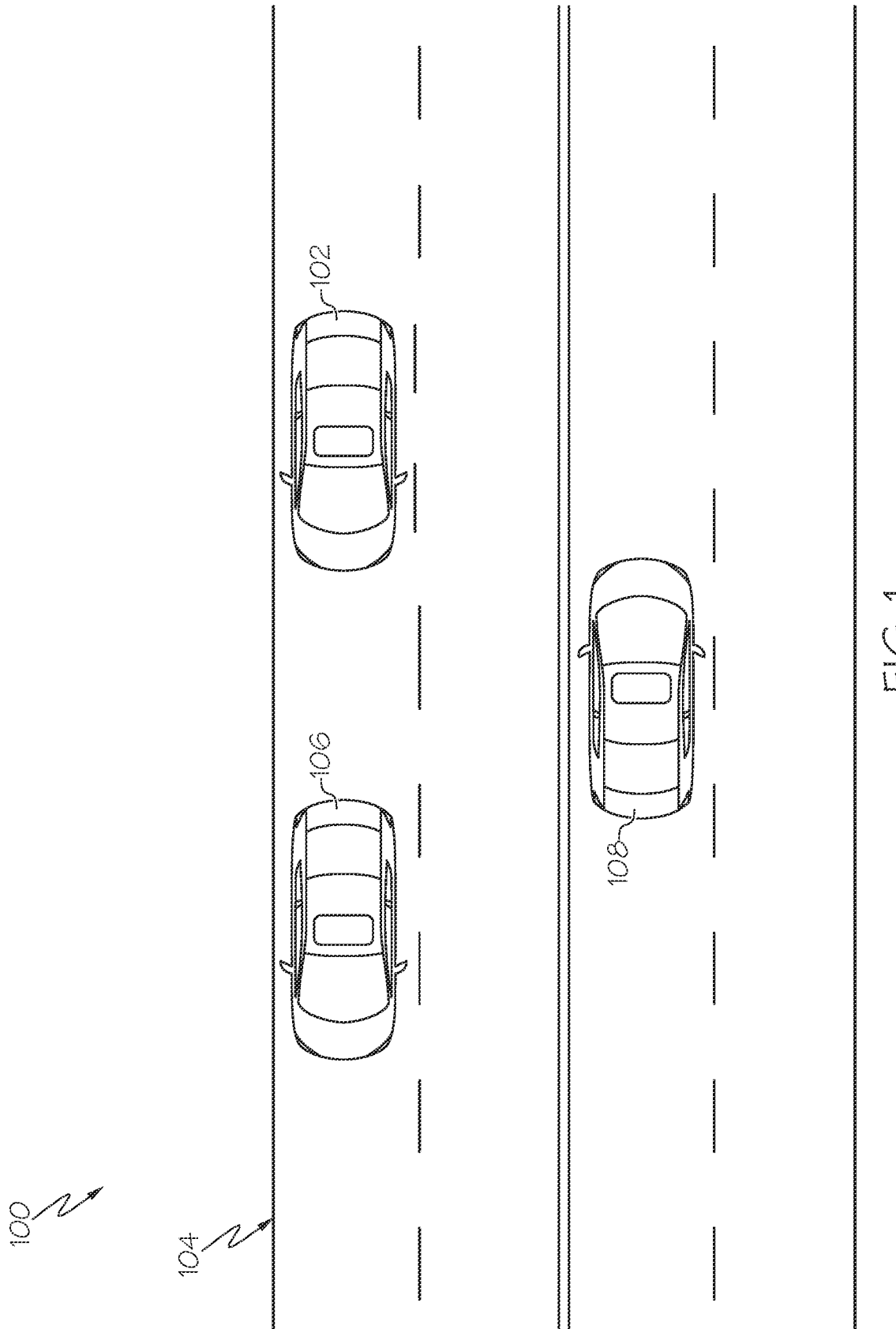
FIG. 1 schematically depicts a system for performing level L2 autonomous driving, according to one or more embodiments shown and described herein.

The embodiments disclosed herein include a method and system for performing autonomous driving. In particular, embodiments disclosed herein are directed to performing L2 autonomous driving. In L2 autonomous driving a vehicle system autonomously performs steering and acceleration for a vehicle. However, a human driver is expected to monitor the driving performance of the vehicle and take over manual driving if necessary. For example, if weather conditions or other factors make it difficult for the vehicle system to perform autonomous driving, the human driver is expected to take over manual driving. In addition, if the vehicle system begins to make driving errors or take driving actions that the driver disagrees with, the driver may take over manual driving.

Because the human driver is expected to take over manual driving in a variety of situations, it is important for the driver to remain attentive and monitor the vehicle while it is being autonomously driven. However, while the vehicle is being driven autonomously, the driver may be tempted to turn their focus away from monitoring the driving of the vehicle. For example, the driver may look at their phone, look at other passengers, or look in other directions that do not allow the driver to monitor the driving of the vehicle. This may prevent the driver from being able to quickly take over manual driving if it becomes necessary to do so.

As such, it may be desirable for the vehicle system to monitor the driver to ensure that the driver is actively monitoring the driving performance of the vehicle. If the driver is not actively monitoring the driving performance of the vehicle, the vehicle system can output a warning to refocus the driver's attention. However, the amount of attention required by the driver may increase or decrease based on driving conditions. For example, if the vehicle is driving alone on a highway, it is less likely that the driver will need to quickly take over manual control of the vehicle. As such, it may be satisfactory for the driver to pay relatively less attention to the driving performance of the vehicle.

However, if the vehicle is driving in heavy traffic, it is more likely that the driver will need to quickly take over manual control of the vehicle. Thus, more attention from the driver may be required.

In embodiments, a vehicle system collects external sensor data while performing autonomous driving. The sensor data may be used to plan a vehicle trajectory and to perform autonomous driving. The sensor data may also be used to determine the riskiness of a driving situation. The vehicle system may then determine a glance away duration allowance (GADA) based on the riskiness of the driving situation. The GADA is an amount of time that a driver is allowed to glance away from specified locations associated with driving monitoring (e.g., front windshield, rear view mirrors, side view mirrors) before concern is raised. The riskier the driving situation, the lower the GADA should be. As such, as the vehicle drives through different conditions, the GADA may continually be adjusted.

The vehicle system may also capture images of the driver while performing autonomous driving. The vehicle system may then determine the direction that the driver is looking based on the captured images. In particular, the vehicle system may determine whether the driver is looking away from the specified locations associated with driving monitoring. If the driver does look away from the specified locations, the vehicle system may determine a duration that the driver looks away from the specified locations. If this duration exceeds the GADA, the vehicle system may issue a warning to the driver to refocus the driver's attention on monitoring driving performance.

In addition, the vehicle system may determine a scope of autonomous driving based on the riskiness of the driving situation and the driver's attentiveness. In particular, if the driving situation is riskier and/or the driver is less attentive, the vehicle system may perform autonomous driving in a more conservative manner (e.g., driving at a lower speed or with a larger following distance to other vehicles). If the driving system is less risky and/or the driver is more attentive, the vehicle system may perform autonomous driving in a more aggressive manner. As such, the scope of autonomous driving may be continually adjusted based on driving conditions and the driver's attentiveness.

Turning now to the figures, FIG. 1 depicts a system for performing driving assistance, as disclosed herein. In the example of FIG. 1, a system 100 includes an ego vehicle 102 driving along a road 104. In the example of FIG. 1, two other vehicles 106, 108 also drive along the road 104. However, in other examples, any number of other vehicles may drive along the road 104.

In the example of FIG. 1, the ego vehicle 102 may be a semi-autonomous vehicle capable of performing L2 autonomous driving. That is, the ego vehicle 102 may perform autonomous driving while a human driver monitors the vehicle, and is able to assume manual control of the vehicle if necessary.

Figure 2:
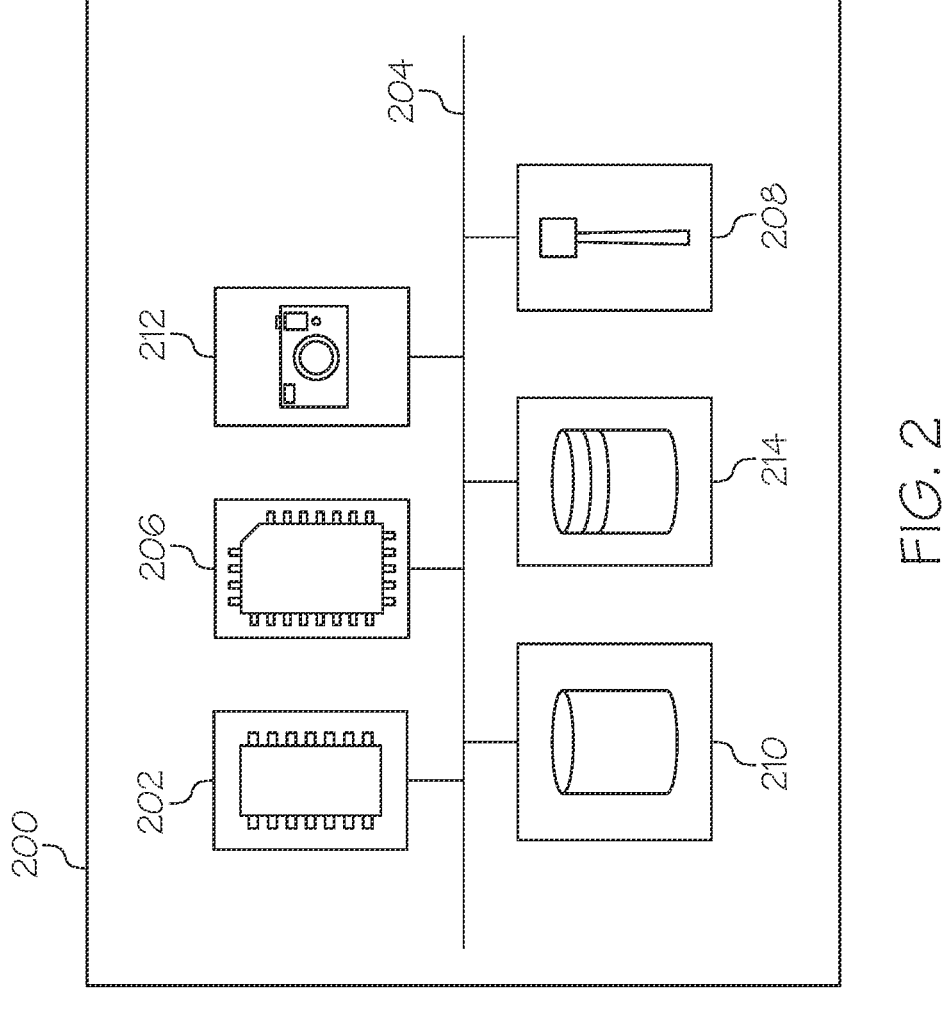
FIG. 2 schematically depicts a vehicle system, according to one or more embodiments shown and described herein.

FIG. 2 depicts an example vehicle system 200 that may be included in the ego vehicle 102 of FIG. 1. In the example of FIG. 2, the vehicle system 200 includes one or more processors 202, a communication path 204, one or more memory modules 206, a satellite antenna 208, one or more vehicle sensors 210, a camera 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. The vehicle sensors 210 may collect data that may be used to perform autonomous driving functions.

Still referring to FIG. 2, the vehicle system 200 comprises a camera 212. The camera 212 may capture images of a driver of the ego vehicle 102. In particular, the camera 212 may continually capture images of the driver's head and eyes over time. In embodiments, the camera 212 may be positioned inside the ego vehicle 102 such that it is able to capture images of the driver's head and eyes. In one example, the camera 212 may be positioned on a dashboard of the ego vehicle 102. However, in other examples, the camera 212 may be positioned in other locations inside of the ego vehicle 102. As the camera 212 captures images of the driver, the images may be processed to determine a direction that the driver is looking, as well as a level of attentiveness of the driver, as discussed in further detail below.

Still referring to FIG. 2, the vehicle system 200 comprises a data storage component 214. The data storage component 214 may store data used by various components of the vehicle system 200. In addition, the data storage component 214 may store data collected by the vehicle sensors 210 and images captured by the camera 212.

Figure 3:
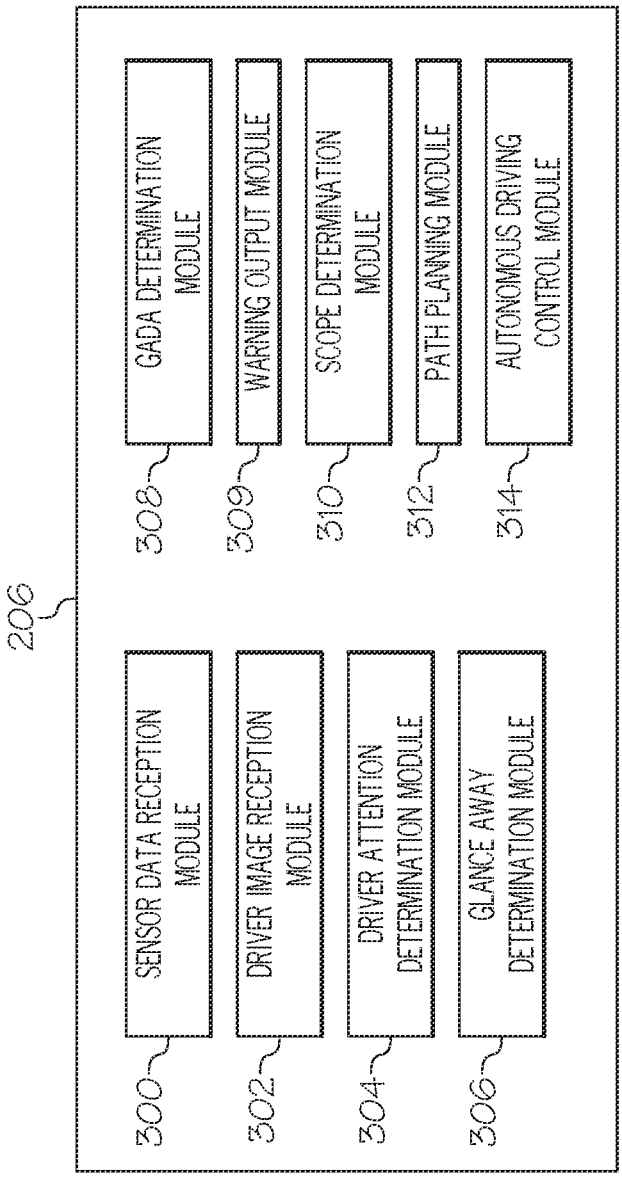
FIG. 3 schematically depicts memory modules of the vehicle system of FIG. 2, according to one or more embodiments shown and described herein.

Now referring to FIG. 3, the memory modules 206 of the vehicle system 200 are schematically shown. The one or more memory modules 206 include a sensor data reception module 300, a driver image reception module 302, a driver attention determination module 304, a glance away determination module 306, a GADA determination module 308, a warning output module 309, a scope determination module 310, a path planning module 312, and an autonomous driving control module 314. Each of the sensor data reception module 300, the driver image reception module 302, the driver attention determination module 304, the glance away determination module 306, the GADA determination module 308, the warning output module 309, the scope determination module 310, the path planning module 312, and the autonomous driving control module 314 may be a program module in the form of operating systems, application program modules, and other program modules stored in the one or more memory modules 206. In some embodiments, the program module may be stored in a remote storage device that may communicate with the vehicle system 200. Such a program module may include, but is not limited to, routines, subroutines, programs, objects, components, data structures and the like for performing specific tasks or executing specific data types as will be described below.

The sensor data reception module 300 may receive sensor data from the vehicle sensors 210. The sensor data received by the sensor data reception module 300 may indicate a driving environment of the ego vehicle 102. For example, the received sensor data may indicate positions, speeds, trajectories and other information about other road agents (e.g., vehicles and pedestrians). The received sensor data may also indicate positions and shapes of traffic infrastructure (e.g., shapes of roads, states of traffic lights, and the like). The received sensor data may also include other environmental data such as weather data, visibility information, and the like. The information received by the sensor data reception module 300 may be used by the path planning module 312 to plan a trajectory for the ego vehicle 102, and may be used by the autonomous driving control module 314 to autonomously control the ego vehicle 102, as discussed in further detail below.

The driver image reception module 302 may receive one or more images of the driver of the ego vehicle 102 captured by the camera 212. As discussed above, the camera 212 continually capture images of the driver's head and eyes at predetermined intervals (e.g., every second). These images may be received by the driver image reception module 302. The received images may be processed by the driver attention determination module 304 to determine where the driver is looking, as discussed in further detail below.

The driver attention determination module 304 may determine where a driver's attention is focused based on the images received by the driver image reception module 302, as disclosed herein. As discussed above, the driver image reception module 302 may receive images of the driver of the ego vehicle 102 captured by the camera 212. In particular, the driver image reception module 302 may receive images of the driver's head and eyes. The driver attention determination module 304 may perform image processing on the received images to determine a direction in which the driver's eyes are looking. In some examples, the driver attention determination module 304 may be part of a driver monitoring system or a driver state monitoring system.

In embodiments, the driver attention determination module 304 may determine an eye gaze direction of the driver at each of a plurality of time steps. An eye gaze direction may indicate a direction that the eyes of the driver are looking. In some examples, the driver attention determination module 304 may determine a direction in which the driver's attention is focused during a predetermined interval of time (e.g., over 3 seconds). In one example, the driver attention determination module 304 may determine a direction of the driver's attention during a predetermined interval of time based on where the driver's eye gaze is focused the most during the predetermined interval of time. For example, if the driver is looking straight ahead for two seconds, then briefly looks to the side before again looking straight ahead for another second, the driver attention determination module 304 may determine that the driver's attention is focused straight ahead during that three second interval.

In some examples, in addition to determining a direction that the driver's eyes are looking, the driver attention determination module 304 may also determine an attentiveness of the driver. The attentiveness of the driver may indicate how alert or how drowsy the driver appears to be based on the images received by the driver image reception module 302. In one example, the driver attention determination module 304 may determine how alert the driver is based on how often the driver's eyes are open during a predetermined period of time. For example, if the driver's eyes are closed 50% of the time during a three second interval, the driver attention determination module 304 may determine that the driver may be falling asleep. In other examples, the driver attention determination module 304 may determine an attentiveness of the driver based on other factors such as a head position of the driver, pupil dilation of the driver, eye blinking frequency, eye gaze movement, head movement, facial expressions, and the like. In some examples, the driver attention determination module 304 may determine an alertness score indicating how alert the driver appears to be. For example, an alertness score may range from 0 to 1, where 1 indicates that the driver is completely attentive, and 0 indicates that the driver is asleep.

Referring still to FIG. 3, the glance away determination module 306 may determine a duration of time during which the driver of the ego vehicle 102 is looking away from locations indicating that the driver is paying attention to the driving of the vehicle. As discussed above, the driver attention determination module 304 may determine a direction that the driver of the ego vehicle 102 is looking at each of a plurality of time steps. This may then be mapped to known positions of components of the ego vehicle 102 to determine what part of the ego vehicle 102 the driver is looking at each of the plurality of time steps. In particular, the data storage component 214 may store directions of a plurality of vehicle components with respect to the driver (e.g., directions of the windshield, the rear view mirrors, the side view mirrors, the instrument panel, the vehicle doors, the windows, and the like). Furthermore, certain of these vehicle components may marked as acceptable for viewing by the driver during autonomous driving. That is, if the driver is looking at acceptable locations (e.g., windshield, rear view mirror, side view mirrors, instrument panel), then it may be presumed that the driver is actively monitoring the driving of the ego vehicle 102. However, if the driver is looking at locations other than the acceptable locations (e.g., looking out the windows, looking at other passengers, looking at their phone), it may be determined that the driver is not actively monitoring the driving of the ego vehicle 102. In some examples, the acceptable locations may vary based on particular driving situations. For example, if another vehicle is passing the ego vehicle 102 to the left, the left window of the ego vehicle 102 may become an acceptable viewing location.

In embodiments, each time that the driver attention determination module 304 determines a direction that the driver is looking, the glance away determination module 306 may determine whether the driver is looking at an acceptable location. In particular, the glance away determination module 306 may determine whether a direction that the driver is looking is within a threshold amount of a direction that matches an acceptable location (e.g., within 10 degrees of the acceptable location in an x-axis and a y-axis). If the direction that the driver is looking does not match an acceptable location, then the glance away determination module 306 may determine a length of time until the driver's gaze returns to an acceptable location. As such, the glance away determination module 306 may determine a duration of time that the driver glances away from acceptable locations. This may indicate a duration of time that the driver is not actively monitoring the driving of the ego vehicle 102.

Referring still to FIG. 3, the glance away duration allowance (GADA) determination module 306 may determine a glance away duration allowance, as disclosed herein. As discussed above, the glance away determination module 306 may determine a length of time that the driver of the ego vehicle 102 glances away from acceptable locations while the ego vehicle 102 is performing autonomous driving, thereby indicating that the driver is not actively monitoring the driving of the ego vehicle 102 during this duration of time. As discussed above, in an L2 autonomous driving system the driver is expected to actively monitor the driving of the vehicle and take over manual driver if the need arises. However, humans are not expected to maintain 100% focus all the time. In particular, if the driver glances away for a short duration of time, it may be acceptable, whereas if the driver glances away for a long duration of time, it may be more concerning. Accordingly, in embodiments, the GADA determination module 308 determines a glance away duration allowance, which indicates a duration of time that the driver is allowed to glance away before an intervention is performed.

In embodiments, the GADA determination module 308 may determine the glance away duration allowance based on a number of actors. In one example, the GADA determination module 308 may determine the allowance based on how risky the current driving situation is. For example, in a less risky driving situation, it is less likely that the driver will need to quickly take over manual driving, and as such, a longer glance away duration may be allowed. However, in a more risky driving situation, it is more likely that the driver will need to quickly take over manual driving. As such, a shorter glance away duration may be allowed in risky driving situations.

In one example, the GADA determination module 308 may determine the duration allowance based on traffic conditions. For example, the more vehicles that are surrounding the ego vehicle 102 (e.g., the more vehicles that are within a predetermined distance from the ego vehicle 102), the shorter the duration allowance may be. In another example, the duration allowance may be based on the number of vehicles that are passing the ego vehicle 102 (e.g., the more vehicles passing the ego vehicle 102, the shorter the duration allowance may be). In another example, the duration allowance may be based on a speed of the ego vehicle 102 or other surrounding vehicles (e.g., the duration allowance may be shorter as the speed of the ego vehicle 102 increases). In another example, the duration allowance may be based on road geometry (e.g., the duration allowance may be shorter when the ego vehicle 102 is approaching curves, turns, or intersections than when the ego vehicle 102 is driving along a straightaway). In another example, the duration allowance may be based on traffic infrastructure around the ego vehicle 102 (e.g., the duration allowance may be shorter when there are traffic lights within a predetermined distance from the ego vehicle 102).

In some examples, the GADA determination module 308 may determine the glance away duration allowance based on how attentive the driver is. If the driver is less attentive (e.g., sleepy or drowsy), it may take longer for the driver to take over manual driving if necessary. Accordingly, in embodiments, the GADA determination module 308 may determine the glance away duration allowance based on the attentiveness of the driver, as determined by the driver attention determination module 304. For example, the lower the attentiveness of the driver, the shorter the duration allowance may be.

In some examples, the GADA determination module 308 may determine the glance away duration allowance based on environmental conditions. For example, the GADA determination module 308 may determine a relatively shorter duration allowance in inclement weather or in low visibility conditions.

In some examples, the GADA determination module 308 may determine the glance away duration allowance based on a risk of silent failure. A silent failure may occur when an autonomous driving system makes an error that is not detectable by the autonomous driving system itself. For example, if autonomous driving is unable to be performed because inclement weather is reducing the effectiveness of vehicle sensors 210, the vehicle system would be aware of this failure, and could alert the driver that manual driving is needed. As such, this would not be a silent failure. However, if the ego vehicle 102 makes a driving error and does not realize that an error has been committed, this would be a silent failure.

In some examples, an autonomous driving vehicle may be trained to perform autonomous driving or tested on autonomous driving performance by performing autonomous driving while a human safety driver is in the vehicle. While the vehicle is driving autonomously, the safety driver may take over manual driving if the safety driver observes the autonomous driving vehicle making a driving error. When this occurs, the vehicle may record the event as a silent failure. In particular, the vehicle may record the location where the silent failure occurred. A database may be maintained of all such silent failures. Accordingly, a map may be maintained of silent failure rates in various locations. As such, in embodiments, the GADA determination module 308 may determine a relatively shorter duration allowance in locations having a higher silent failure rate than in locations having a lower silent failure rate.

Referring still to FIG. 3, the warning output module 309 may output a warning when a glance away duration, as determined by the glance away determination module 306, exceeds the glance away duration allowance, as determined by the GADA determination module 308. As discussed above, the driver glancing away from acceptable locations indicate that the driver is not paying sufficient attention to the driving of the ego vehicle 102. As such, when the driver glances away for more than the allowable duration, the warning output module 309 may output a warning.

In some examples, the warning output module 309 may output a visual warning (e.g., a blinking light or a display on an instrument panel). In some examples, the warning output module 309 may output an audio warning (e.g., a beeping sound, an alarm sound, or the like). In some examples, the warning output module 309 may output a visual and an audio warning. In some examples, the warning output module 309 may output a first warning (e.g., a visual warning) when the driver glances away for longer than the duration allowance. If the driver then returns their gaze to an acceptable location, the warning may be removed. However, if the driver continues to glance away from the acceptable locations for a second duration of time, the warning output module 309 may output a second warning (e.g., a second warning). In some examples, the first warning may be less intrusive than the second warning. That is, the warning output module 309 may first provide a gentle warning to the driver to pay attention to the driving of the ego vehicle 102, and may proceed to output increasing less gentle warnings if the driver continues to glance away.

In some examples, the severity of the warning output by the warning output module 309 may depend on the riskiness of the driving situation. For example, in less risky driving situations (e.g., less traffic), the warning output module 309 may output a gentle warning when the glance away duration of the driver exceeds the allowed duration. However, in riskier driving situations (e.g., more traffic), the warning output module 309 may output a less gentle warning when the glance away duration of the driver exceeds the allowed duration.

Referring still to FIG. 3, the scope determination module 310 may determine a scope of autonomous driving to be performed by the ego vehicle 102, as disclosed herein. When performing autonomous driving, the path planning module

312 may determine a trajectory for the ego vehicle 102 and the autonomous driving control module 314 may cause the ego vehicle 102 to autonomously drive along the path. However, the scope of autonomous driving may be set by the scope determination module 310, which may change how the path planning module 312 and the autonomous driving control module 314 operate, as disclosed herein.

When performing autonomous driving, the path planning module 312 and the autonomous driving control module 314 may follow certain rules. However, in certain driving situations, it may be desirable to modify those rules. In particular, if the driver is not paying sufficient attention to the driving of the ego vehicle 102, or the driving situation is particularly risky, it may be desirable to limit the scope of autonomous driving such that the ego vehicle 102 is driven more conservatively.

In one example, the scope determination module 310 may modify the scope of autonomous driving to be performed by the ego vehicle 102 when the glance away duration of the driver exceeds the glance away duration allowance. The scope of autonomous driving may limit how aggressively the ego vehicle 102 is autonomously driven. In some examples, the vehicle system 200 may have a predetermined number of scope levels, and the scope determination module 310 may select one of the predetermined scope levels. The path planning module 312 and the autonomous driving control module 314 may follow different rules when performing autonomous driving based on the scope level.

In one example, the vehicle system 200 may have four scope levels. A first scope level may indicate normal autonomous driving, a second scope level may indicate somewhat conservative autonomous driving, a third scope level may indicate highly conservative autonomous driving, and a fourth scope level may indicate that autonomous driving should be stopped and the vehicle should pull over to the side of the road and stop driving. However, in other examples, any number of scope levels may be defined.

In embodiments, the scope of autonomous driving determined by the scope determination module 310 may cause the ego vehicle 102 to perform more or less aggressive driving. In one example, different scope levels may cause the ego vehicle 102 to drive at different maximum speeds (e.g., drive at a lower maximum speed in a less aggressive driving scope). In another example, different scope levels may cause the ego vehicle 102 to change following distances to other vehicles (e.g., in a less aggressive driving scope, the ego vehicle 102 may increase the following distance to other vehicles). In another example, different scope levels may determine whether the ego vehicle 102 drives through yellow traffic lights, or changes the speed that the ego vehicle 102 approaches stale green traffic lights.

The scope determination module 310 may set the scope of autonomous driving based on a variety of factors, as disclosed herein. In one example, the scope determination module 310 may set the scope of autonomous driving based on whether the driver glance away duration has exceeded the duration allowance, and by how long the driver glance away duration has exceeded the duration allowance. In one example, the scope determination module 310 may set the scope of autonomous driving based on how attentive the driver is, as determined by the driver attention determination module 304. In another example, the scope determination module 310 may set the scope of autonomous driving based on how risky a driving situation is (e.g., how much traffic is around the ego vehicle 102). In another example, the scope determination module 310 may set the scope of autonomous driving based on the risk of silent failure in the area that the ego vehicle 102 is located. In another example, the scope determination module 310 may set the scope of autonomous driving based on environmental factors (e.g., weather conditions, visibility). After setting the scope of autonomous driving, the scope determination module 310 may transmit a signal to the path planning module 312 and the autonomous driving control module 314 indicating the determined scope.

Referring still to FIG. 3, the path planning module 312 may determine a trajectory for the ego vehicle 102 to follow while the vehicle system 200 is performing autonomous driving. In particular, the path planning module 312 may determine a trajectory based on sensor data received by the sensor data reception module 300, and the scope set by the scope determination module 310.

The autonomous driving control module 314 may control steering, acceleration, and/or other vehicle functions to autonomously control the ego vehicle 102 while the vehicle system 200 is performing autonomous driving. The autonomous driving control module 314 may control the ego vehicle 102 to perform autonomous driving based on sensor data received by the sensor data reception module 300, the scope set by the scope determination module 310, and trajectories determined by the path planning module 312.

Figure 4:
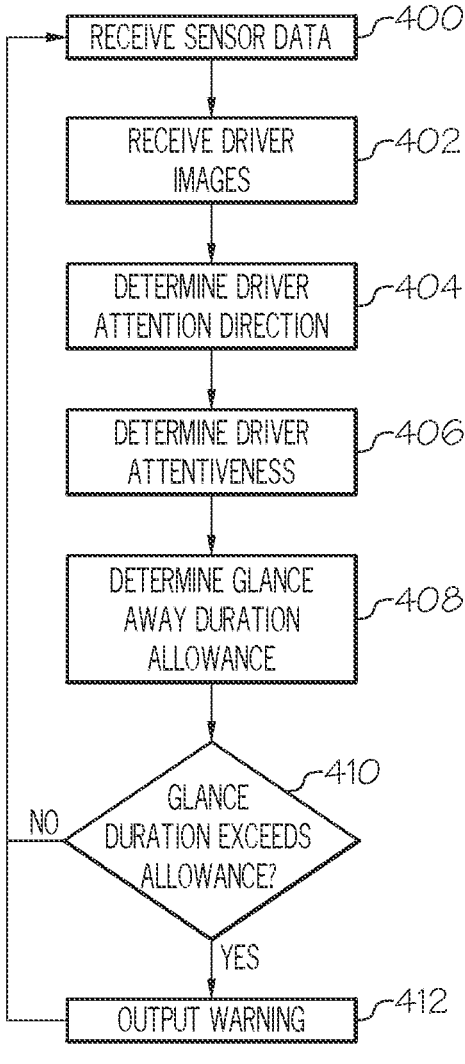
FIG. 4 depicts a flowchart of a method that may be performed by the vehicle system of FIG. 2, according to one or more embodiments shown and described herein.

FIG. 4 depicts a flowchart of an example method that may be performed by the vehicle system 200 of FIG. 2. The method of FIG. 4 may be continually performed at a plurality of time steps.

At step 400, the sensor data reception module 300 receives sensor data from the vehicle sensors 210. At step 402, the driver image reception module 302 receives one or more images of the driver of the ego vehicle 102 captured by the camera 212. In particular, the driver image reception module 302 may receive one or more images of the head and eyes of the driver at each of a plurality of time steps.

At step 404, the driver attention determination module 304 determines a direction that the driver is looking and/or a direction of the driver's attention at each of the plurality of time steps based on the images received by the driver image reception module 302. At step 406, the driver attention determination module 304 determines a level of attentiveness of the driver based on the images received by the driver image reception module 302.

At step 408, the GADA determination module 308 determines a glance away duration allowance based on the driver's level of attentiveness, as determined by the driver attention determination module 304, and based on a riskiness of the driving situation, based on the sensor data received by the sensor data reception module 300.

At step 410, the glance away determination module 306 determines a duration that the driver has glanced away from one or more predetermined acceptable directions. The glance away determination module 306 then determines whether the duration that the driver has glanced away from the acceptable directions exceeds the glance away duration allowance determined by the GADA determination module 308. If the duration that the driver has glanced away exceeds the duration allowance (Yes at step 410), then at step 412, the warning output module 309 outputs a warning to the driver of the ego vehicle 102. If the duration that the driver has glance away does not exceed the duration allowance (No at step 410), then control returns to step 400.

Figure 5:
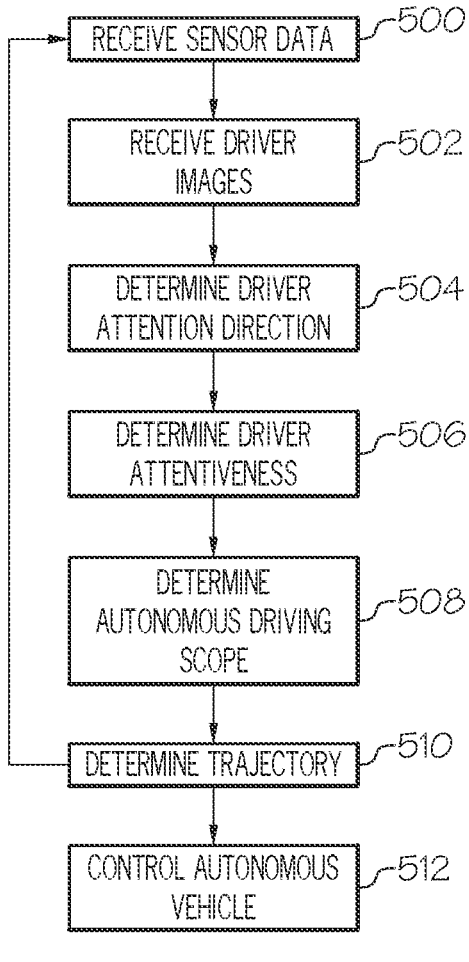
FIG. 5 depicts a flowchart of another method that may be performed by the vehicle system of FIG. 2, according to one or more embodiments shown and described herein.

FIG. 5 depicts a flowchart of another example method that may be performed by the vehicle system 200 of FIG. 2. The method of FIG. 5 may be continually performed at a plurality of time steps.

At step 500, the sensor data reception module 300 receives sensor data from the vehicle sensors 210. At step 502, the driver image reception module 302 receives one or more images of the driver captured by the camera 212.

At step 504, the driver attention determination module 304 determines a direction that the driver is looking and/or a direction of the driver's attention based on the images received by the driver image reception module 302. At step 506, the driver attention determination module 304 determines a level of attentiveness of the driver based on the images received by the driver image reception module 302.

At step 508, the scope determination module 310 determines a scope of autonomous driving for the ego vehicle 102 based on the level of attentiveness of the driver and/or the riskiness of the driving situation based on the data received by the sensor data reception module 300. The determined scope may limit the autonomous driving actions that may be performed by the ego vehicle 102 (e.g., limiting the maximum speed or following distance to other vehicles).

At step 510, the path planning module 312 determines a trajectory for the ego vehicle 102 to follow based on the data received by the sensor data reception module 300 and the scope determined by the scope determination module 310. At step 512, the autonomous driving control module 314 controls the ego vehicle 102 to perform autonomous driving based on the data received by the sensor data reception module 300, the scope determined by the scope determination module 310, and the trajectory determined by the path planning module 312.

It should now be understood that embodiments described herein are directed to performing level L2 autonomous driving. By monitoring the eye gaze direction of a human driver, a vehicle system may determine how attentive the driver is to the autonomous driving performance of the vehicle. A gaze away duration allowance may be determined based on the attentiveness of the driver and driving conditions. The gaze away duration allowance may be continually adjusted as driving conditions change. As such, the amount of time that the driver is allowed to gaze away may be higher in less risky driving situations and lower in riskier driving situations. Accordingly, the driver may be warned to pay more attention in riskier situations where it is more vital to do so, and may not be bothered as much in situations where less attention is required.

Furthermore, the vehicle system may set a scope of autonomous driving based on driving conditions and the attentiveness of the driver. As such, the vehicle system may drive more cautiously when driving conditions are riskier or when the driver is paying less attention. This may ensure that sufficient time is available for the human driver to take over manual driving when necessary in a variety of different driving conditions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system of a vehicle comprising one or more processors configured to:

receive first data indicating a driving environment of the vehicle while performing autonomous driving;

receive second data indicating a direction that a driver of the vehicle has looked at a plurality of time steps;

determine a first duration of time that the driver is allowed to look away from a first set of predetermined directions based on the first data;

determine a second duration of time that the driver has looked away from the first set of predetermined directions based on the second data; and when the second duration of time is greater than the first duration of time, output a warning to the driver.

2. The vehicle system of claim 1, wherein the one or more processors are further configured to:

receive third data indicating an attentiveness of the driver; and determine the first duration of time based at least in part on the third data.

3. The vehicle system of claim 2, wherein the one or more processors are further configured to, when the second duration of time is greater than the first duration of time:

output a first warning to the driver when the attentiveness of the driver is greater than or equal to a first threshold level; and output a second warning to the driver when the attentiveness of the driver is less than the first threshold level.

4. The vehicle system of claim 1, wherein the one or more processors are further configured to:

determine the first duration of time based at least in part on an amount of vehicle traffic in the driving environment of the vehicle.

5. The vehicle system of claim 1, wherein the one or more processors are further configured to:

determine the first duration of time based at least in part on a number of pedestrians in the driving environment of the vehicle.

6. The vehicle system of claim 1, wherein the one or more processors are further configured to:

receive a location of the vehicle;

determine a risk of autonomous driving failure based on the location; and determine the first duration of time based at least in part on the risk of autonomous driving failure.

7. The vehicle system of claim 1, wherein the one or more processors are further configured to:

determine the first duration of time based at least in part on a level of visibility.

8. The vehicle system of claim 1, wherein the one or more processors are further configured to:

determine whether the driver looks at a direction among the first set of predetermined directions within a third predetermined duration of time after outputting the warning; and upon determination that the driver does not look at a direction among the first set of predetermined directions within the third predetermined duration of time after outputting the warning, output a second warning.

9. The vehicle system of claim 1, wherein the one or more processors are further configured to:

when the second duration of time is greater than the first duration of time, limit a scope of autonomous driving to be performed.

10. The vehicle system of claim 9, wherein the one or more processors are further configured to:

limit the scope of autonomous driving to be performed by lowering a maximum speed to be driven by the vehicle.

11. The vehicle system of claim 9, wherein the one or more processors are further configured to:

limit the scope of autonomous driving to be performed by increasing a following distance to other vehicles to be observed by the vehicle.

12. A method comprising:

receiving first data indicating a driving environment of a vehicle while performing autonomous driving;

receiving second data indicating a direction that a driver of the vehicle has looked at a plurality of time steps;

determining a first duration of time that the driver is allowed to look away from a first set of predetermined directions based on the first data;

determining a second duration of time that the driver has looked away from the first set of predetermined directions based on the second data; and when the second duration of time is greater than the first duration of time, outputting a warning to the driver.

13. The method of claim 12, further comprising:

receiving third data indicating an attentiveness of the driver; and determining the first duration of time based at least in part on the third data.

14. The method of claim 13, further comprising, when the second duration of time is greater than the first duration of time:

outputting a first warning to the driver when the attentiveness of the driver is greater than or equal to a first threshold level; and outputting a second warning to the driver when the attentiveness of the driver is less than the first threshold level.

15. The method of claim 12, further comprising:

determining the first duration of time based at least in part on an amount of vehicle traffic in the driving environment of the vehicle.

16. The method of claim 12, further comprising:

receiving a location of the vehicle;

determining a risk of autonomous driving failure based on the location; and determining the first duration of time based at least in part on the risk of autonomous driving failure.

17. The method of claim 12, further comprising:

determining whether the driver looks at a direction among the first set of predetermined directions within a third predetermined duration of time after outputting the warning; and upon determination that the driver does not look at a direction among the first set of predetermined directions within the third predetermined duration of time after outputting the warning, outputting a second warning.

18. The method of claim 12, further comprising:

when the second duration of time is greater than the first duration of time, limiting a scope of autonomous driving to be performed.

19. The method of claim 18, further comprising:

limiting the scope of autonomous driving to be performed by lowering a maximum speed to be driven by the vehicle.

20. The method of claim 18, further comprising:

limiting the scope of autonomous driving to be performed by increasing a following distance to other vehicles to be observed by the vehicle.

* * * * *